No. 648,436. Patented May 1, 1900.
C. B. RIDER.
SECTIONAL GLASS CUP.
(Application filed Jan. 8, 1900.)
(No Model.)

WITNESSES:
A. V. Groupe
C. E. Parker

INVENTOR
Charles B. Rider
BY
J. N. Hutton
ATTORNEY

UNITED STATES PATENT OFFICE.

CHARLES B. RIDER, OF PHILADELPHIA, PENNSYLVANIA.

SECTIONAL GLASS CUP.

SPECIFICATION forming part of Letters Patent No. 648,436, dated May 1, 1900.

Application filed January 8, 1900. Serial No. 700. (No model.)

*To all whom it may concern:*

Be it known that I, CHARLES B. RIDER, a citizen of the United States, residing at Philadelphia, in the State of Pennsylvania, have invented certain new and useful Improvements in Sectional Glass Cups, of which the following is a full, clear, and exact description, reference being had to the accompanying drawings, forming a part of this specification.

My invention relates to sectional glass cups, and is particularly adapted to the specific character of glass cup known as a "graduate glass" for druggists' use.

My invention has for its object to make the device less breakable, especially at or near its base portion; and my improvements consist, primarily, in providing such a glass with a base-support below the neck portion of a greater depth or thickness than usual, said base-support being circular and provided on its periphery with male screw-threads in combination with a detachable base-piece of non-fragile material of suitable exterior shape and provided with a circular recess, the vertical side of which is provided with female screw-threads, said recessed screw-threads being adapted to receive and register with the screw-threaded base-support of the glass cup; also, in the combination therewith of a cushion adapted to fit into the recess in the detachable non-fragile base, and to receive and support the end face of the base-support of the glass.

Figure 1:
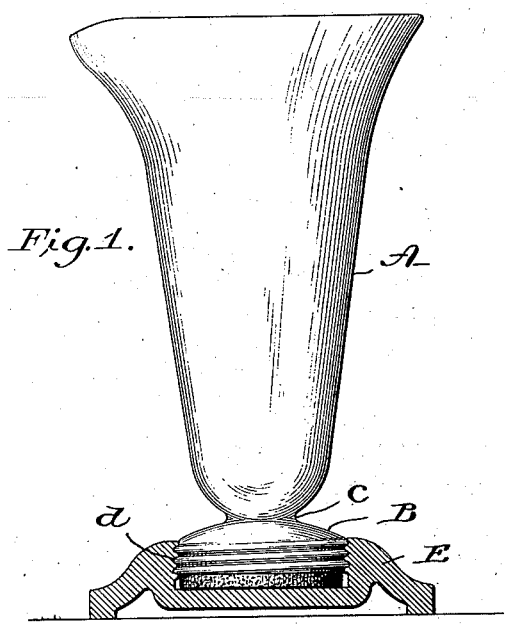
Figure 3:
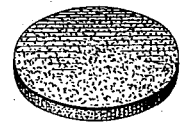
Figure 2:
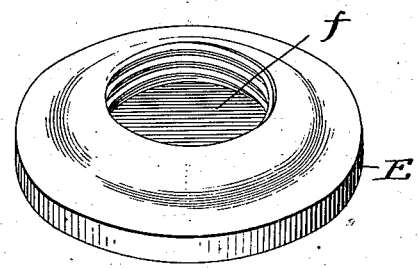
Figure 4:
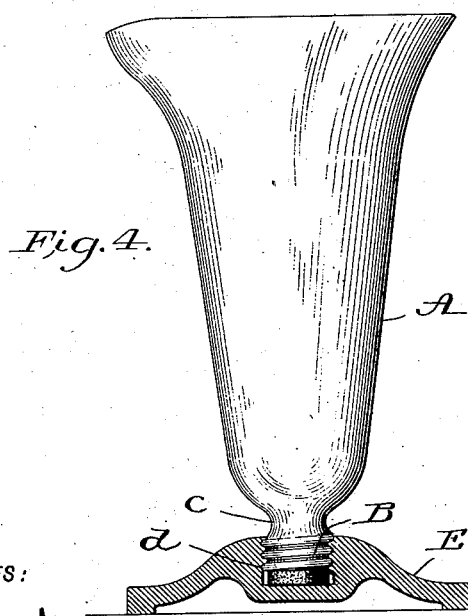

In the drawings illustrating my invention, Figure 1 is a vertical section of glass cup in the form of a graduate-glass illustrating my invention. Fig. 2 is a perspective view of the non-fragile base. Fig. 3 is a perspective view of the cushion, and Fig. 4 is a modified form of the device shown in Fig. 1.

The detachable cup portion of glass is indicated at A in Figs. 1 and 4, and B is the base portion in each below the neck $c$ in each, said base portion in Fig. 1 being shown as of large diameter, which is desirable not only for the purpose of imparting additional strength, but for other purposes, giving it wider or increased utility. However, the diameter of the base is no part of nor does it alter the invention. Said base portion B in both Figs. 1 and 4 is circular in periphery and provided with male screw-threads $d$. The supporting-base is indicated at E and is constructed of any desirable shape in its external periphery and essentially is of non-fragile material, such as metal, hard rubber, or other suitable material of the character named. It is centrally recessed, as shown at $f$, Fig. 2, the diameter of such recess corresponding to the diameter of the base B of the glass cup. The vertical side of said circular recess of the non-fragile base E is provided with female screw-threads, said screw-threaded recess in the base being adapted to receive and register with the screw-threaded base of the detachable glass cup. Obviously, however, the male and female screw-threads may be transposed on the two parts named without changing the character of the invention. The bottom of the recess in the base E limits the depth or extent to which the extension-base B of the cup is to be screwed therein. In said recess of base E is placed a cushion, as shown detached in Fig. 3, said cushion being of any resilient material, such as rubber or cork, which will intercept any vibration, due to contact of the glass and its base with a table or other hard substance, and this is a leading and important feature of the new device, giving to it great utility for the purposes for which it is designed.

Having thus described my invention, what I claim as new, and desire to secure by Letters Patent, is—

A sectional glass cup, composed of a supporting-base of non-fragile material and having a central circular screw-threaded recess, in combination with a detachable glass cup having a cylindrical extension-base below the neck, screw-threaded to adapt it to register with the recess in the non-fragile supporting-base, and a cushion of resilient material, interposed in said recess below the screw-threaded base-piece of the detachable cup; substantially as described.

In testimony whereof I have hereunto affixed my signature this 30th day of December, A. D. 1899.

CHARLES B. RIDER.

Witnesses:
WALTER C. PUSEY,
H. T. FENTON.